S. Wilcox, Jr.,

Air Engine.

No. 1,082. Reissued Nov. 20, 1860.

Fig 2.A

Witnesses.
William P. Gray
Charles H. Denison

Inventor
Stephen Wilcox Jr.
M.S.P.

THE NORRIS PETERS CO., WASHINGTON, D. C.

UNITED STATES PATENT OFFICE.

STEPHEN WILCOX, JR., OF WESTERLY, RHODE ISLAND.

INPROVED AIR-ENGINE.

Specification forming part of Letters Patent No. 23,876, dated May 3, 1859; Reissue No. 1,082, dated November 20, 1860.

DIVISION A.

*To all whom it may concern:*

Be it known that I, STEPHEN WILCOX, Jr., of Westerly, in the county of Washington and State of Rhode Island, have invented certain new and useful Improvements in Hot-Air Engines; and I do hereby declare the following is a full, clear, and exact description thereof, reference being had to the annexed drawings, and to the letters of reference marked thereon, in which—

Figure 1:
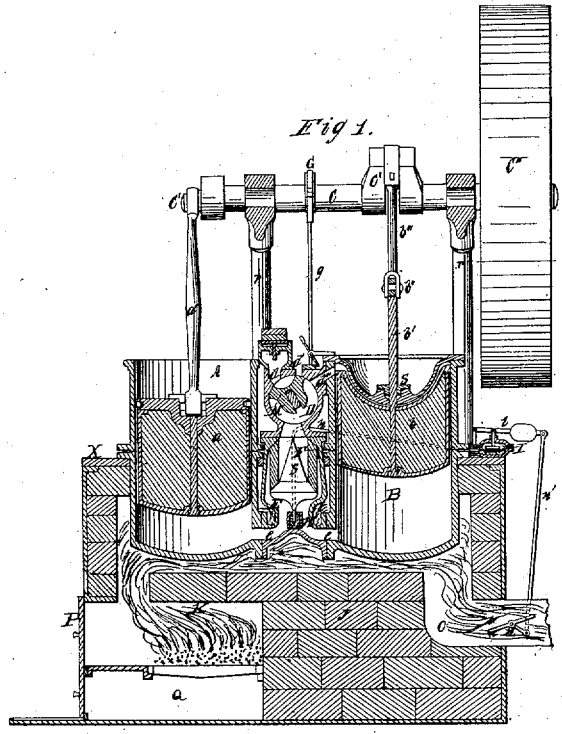
Figure 14:
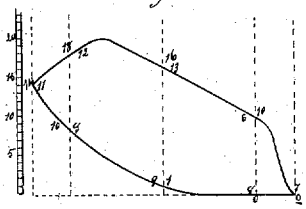
Figure 2:
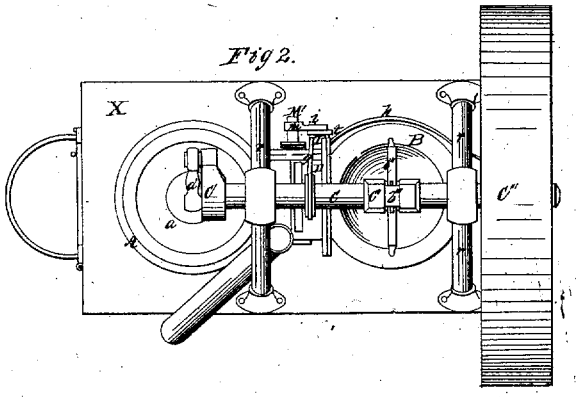
Figure 4:
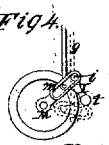
Figure 4:
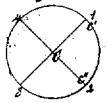
Figure 5:
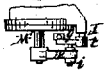
Figure 3:
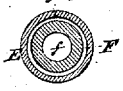

Figure 1 is a vertical longitudinal section through the whole engine. Fig. 2 is a plan view of the same. Fig. 3 is a horizontal section through the regenerator. Fig. 4 is an elevation of the valve-gear. Fig. 5 is a plan of the same. Figs. 6, 7, 8, 9, 10, 11, 12, and 13 are outline figures showing the relative positions of the valve and working-pistons and the relative pressures of the air at various points in a complete revolution. Fig. 14 is a diagram similar to that produced by what is known as an "indicator."

Similar letters of reference denote like parts in all the figures.

The general form of my engine somewhat resembles that invented by Robert Sterling, and patented in England in 1840 and 1847.

The nature of my invention consists, first, in so arranging a connection relatively to the working-cylinder and changing-cylinder, and the regenerator-chamber, that the air expanded by the operation of the changing-piston shall flow directly from the hot end of the changing-cylinder to the working-cylinder, thereby avoiding the loss of effect due to its passage intermediately through a regenerator, refrigerator, or other cooling aparatus; secondly, in a manner of combining and arranging the pistons and the means of effecting the induction and eduction of air in the two cylinders, whereby one of the pistons serves both as a means of changing the air from the cold to the hot end of the cylinder, and also as a means of supplying a fresh measure of air to be used in the next stroke, with an advantage which will be fully shown below; thirdly, in regulating the temperature of the heating-surfaces by the employment of a chamber and diaphragm so arranged relatively to the heating-surfaces and damper in the smoke-flue that the rate of combustion in the furnace is thereby increased and diminished, to keep the surface at a uniform temperature; fourthly, in so constructing the regenerator that it shall gradually increase in area from the cold to the hot side, whereby the resistance to the passage of the air is reduced with a less amount of lost space; fifthly, in combination with two pistons operating in the manner described, so constructing and operating a single valve in a chamber connecting with the cylinders and the external air that one valve performs the several effects of an induction, eduction, and equilibrium valve.

To enable others skilled in the art to make and use my invention, I will proceed to describe its construction and operation.

A is the working-cylinder, and *a* the single-acting working-piston.

B is the changing and supply cylinder, and *b* the piston working therein.

C is the main shaft, supported by the frames *r r'*, and having two cranks, C and C', set at nearly right angles with each other.

C''' is the fly-wheel.

D is the valve-box communicating freely with E, and having three ports, *d d' d''*. Within this is a valve, M.

E is a small chamber containing a regenerator, F, resting on a central cone, *f*. At the lower end of E are two nozzles, *e* and *e'*, which connect with a nozzle upon each of the cylinders A and B, as represented, and form a communication between E and both cylinders. The lower portion of the cylinders A and B, and of the chamber E, form the heating-surfaces.

H is a small cylinder filled with mercury, and connecting, through tube *h*, with a chamber covered by a diaphragm, L. A lever, *l*, connects with a crank on the shaft of damper *n*, the effect of which will be explained further on.

The bed-plate is denoted by X.

J is the brick-work.

Figure 7:
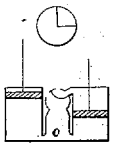
Figure 8:
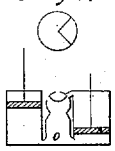
Figure 9:
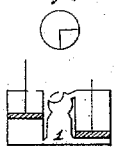

A and B are supported near their centers by a flange resting on X, their lower ends projecting into the flue below, to receive the heat of the furnace. A is open at its upper end, while B is closed by a tight head. Pistons *a* and *b* are made somewhat longer than their stroke, and filled with some non conductor to prevent the heat to which their lower sides are exposed from being communicated to their upper sides. *a* has a long pitman, *a'*, connecting directly with crank C', while the piston *b* has a rod, *b'*, passing through a stuffing-box, *s*, and having a cross-head, *b''*. A short pitman, *b'''*, connects thence with crank C''. The valve M is turned accurately to fit the interior of box D, and has a hollow throat of sufficient width to span ports *d'* and *d''* and the space between them, as shown at Fig. 7. This valve receives an oscillating or partially rotating motion, as follows: The axis of M passes through the head of D, and has a slotted lever, *m*, on its end. (See Figs. 4 and 5.) In the slot plays a roller, *i*, carried on an idle lever, I, which is in turn moved by the eccentric-rod *g*.

The regenerator F is a hollow cylinder. It is composed of concentric spiral or annular layers or sheets of wire cloth. Its internal diameter is such that its area is the same as the ports in D, and the external diameter greater, according as the thickness of the regenerator is increased. The object of making the regenerator in this form is that as the course of the cold air is from the center of the regenerator outward, and the air commences to receive heat and expand immediately upon entering the regenerator, and constantly receives more heat until it escapes at the periphery much increased in volume, it is evident that the area of the passage-way should increase from the cold to the hot side. This is effected by my construction of the regenerator, the outside of the wire cylinder (see Fig. 3) being about double the circumference of the inside, and giving an area of passage-way proportioned to the bulk of the air at all points, whether its motion is from the cold side to the hot or in the reverse direction. Within the regenerator is a cone, *f*, filling it at the bottom and coming to an apex on a line with its top, thereby giving a larger are a for the air to pass at the top, and as the air flows laterally through the regenerator a less area is required below. The taper of the cone *f* gives the proper area at all points and allows no more vacant space than is absolutely required. For the same reason the chamber E tapers outwardly from the top to the bottom of the regenerator.

H is a small cylinder, resting upon the bottom of E, so as to be heated as nearly as possible to the same temperature as the metal upon which it lies. From H, a small tube, *h*, passes upward through *f*, thence through the side of D, and connects with the chamber below the diaphragm L. Upon L rests a small plate having a rod connecting with *l*. From the end of *l* a link, *n'*, connects with a crank on the end of the shaft of damper *n* in the flue *o*. This portion of the engine is of great practical importance, as the change of the structure of the metal in consequence of its being too intensely heated has caused the failure of many otherwise successful air-engines.

It must be observed that the vessel H is not immersed in the products of combustion, and that the motion of the diaphragm L, lever *l*, and damper *n* does not necessarily and should not in many instances correspond with the fluctuations in the heat of the fire. The vessel H is within the chamber E, and in contact with the inner side of the heating-surfaces at its base. Now, the heat of the products of combustion is only one of the elements which go to control the temperature of H; the other is the power with which the engine is working. If the engine is working very moderately, and with little or no load, the temperature of H may rise very nearly to the same point as that of the products of combustion, but when it is working under the opposite conditions the large quantity of air which is to be warmed in any given period tends to cool the interior of the heating-surfaces, and in order to maintain a uniform heat in the metal requires the temperature on the exterior to be considerably higher than before. The apparatus, therefore, is intended to maintain a uniform temperature, not in the gases either on the exterior or interior, but in the metal of the heating-surfaces, and to produce this result by so adjusting the damper *n* as to supply just sufficient heat from the fire under all conditions. This feature of my invention is especially important when the engine is frequently stopped, as without it the metal is liable to become heated to a bright-red heat in a short time, and again to become too much cooled when the engine is started again. The furnace K is supplied with fuel through door P. The brick-work J extends over the fire and shields the bottoms of the cylinders from the direct action of the fire. The products of combustion pass from the furnace and circulate around the bottoms and a portion of the sides of both the cylinders, and finally escape to the chimney through the flue *o*.

Although the operation of an ordinary Stirling engine, on which my improvements are based, is tolerably familiar to those skilled in the art, it may be proper to explain that the expansive power of heated air is rendered available therein by so operating a working and two changing pistons in separate cylinders, that each changing-piston alternately rapidly transfers a measure of air from its cold to its hot side, and then stands nearly stationary, while the expansion of the heated air imparts motion to the engine through the working-piston. The changing-piston then descends and transfers the same air back from the hot to the cold side of the piston, in which transfer it is passed through a refrigerator, and its heat is therein abstracted. By this means the pressure of the air is reduced and the working-piston is allowed to return with less resistance.

In my engine, as in Mr. Stirling's, a measure of air is transferred from the cold to the hot side of the changing piston, and by its expansion the working-piston is forced up and power is imparted to the engine; but at or about the termination of the upstroke of the working-piston the difference becomes apparent, for at this juncture my valve D, by its vibration, opens the eduction-port *d* and allows the hot air to escape, while it also opens the induction port *d'*. As the changing piston descends the space above it is filled by a supply of fresh (or relatively fresh) air drawn either from the atmosphere or from a cool reservoir.

When my engine is worked with the air only at about the atmospheric pressure, the fresh air is drawn directly from the atmosphere, as represented, and the hot air beneath the two pistons is discharged and blown away; but it can, if desired, be worked in the same manner under a higher pressure by connecting a strong reservoir (not represented) with the eduction and induction ports *d* and *d'*. In such case air is compressed by a pump (not represented) until it fills the reservoir to any pressure desired, and the pressure within the engine will correspond therewith, and thus produce a greater effect at each stroke; but when worked in this manner my engine must be provided with a refrigerator analogous in structure, though not in arrangement and effect equivalent, to Mr. Stirling's.

My engine differs from Mr. Stirling's in the following points, viz: Mr. Stirling's working-cylinder is connected to the cold end of his changing cylinders, and the air which is driven from the hot end of the changing-cylinder to actuate the working-piston is cooled by being first passed through a regenerator and a refrigerator, so that it enters cold into the working-cylinder, and thereby a portion of the power of the engine is lost, while in my engine the cylinders are connected at their heated ends, and the air acts directly upon the working-piston in its hottest state, whereby a greater power is developed by the same sized engine. Mr. Stirling uses only the bottoms of his changing-cylinders as heating-surface, and his working-cylinder is studiously kept at a very low temperature, while I use the bottoms of both the changing and working cylinders as heating-surface, whereby the heating-surface is doubled in extent and the engine enabled to run at a greater speed with a proportionate increase of effect. Mr. Stirling alternately transfers the same air from the cold to the hot side of the changing-piston, and vice versa, while mine discharges the hot air and draws in a supply of other air at each stroke. Mr. Stirling's involves a loss of space in the refrigerator, which is analogous in effect to that caused by what is known as "clearance" in steam-engineering, which loss mine avoids, because when the ports *d* and *d'* of my engine communicate with the atmosphere no refrigerator is employed, and when they communicate with a reservoir of compressed air the refrigerator is outside of or beyond the valve, and its pipes, &c., are a portion of the reservoir, and not a portion of the space within the cylinders. The space involved in the refrigerator is not therefore equivalent to clearance in my engine, and is of no effect whatever on the same. The peculiar motions of the two pistons in relation to each other could be effected very perfectly by means of cams, but cranks afford a smoother motion and allow of a more rapid action from the tightness at which the parts may be maintained and the very gradual manner in which the changes occur. For this reason I use two cranks, C' and C'', placed at nearly right angles on the shaft C. The relative motions imparted to the pistons by the cranks is best shown by Fig. 2[a], in which the circle of the crank is divided into four parts. Let crank C' be at 1 and crank C'' at 2. Now, if shaft C is turned to the right one fourth of a revolution C' will be at 2, and C'' at 3, and the piston attached to crank C' will have passed through about three-fourths of its stroke, while the piston attached to crank C'' will have moved up and down through about one-eighth of its stroke. During another fourth of a revolution C' will move up and down through one-eighth of its stroke, while C'' will pass through its three-fourths. Thus it will be seen that the cranks give very nearly the desired motions.

Figs. 4 and 5 show the valve-gearing. The valve M is mounted on a spindle, M', keyed to which is a slotted lever, *m*. I is an idle link driven by eccentric-rod *g*, and turning on a fixed stud, *t*. A roller, *i*, is mounted on this lever. The spindle M' and stud *t* are not in the same horizontal plane, *t* being higher than M', and as lever I vibrates nearly equal distances each side of a horizontal line passing through the center of *t*, it follows that the roller *i* will play longer in the slot during the upward than during the downward stroke, as shown by the dotted lines. It will also be seen that only a slight motion is imparted to the valve except in the middle of the stroke of the eccentric, when the valve will be moved rapidly from one extreme position to the other. Also, that the valve requires to be turned in the upward position about two-thirds of the time, and in the downward about one-third, and to be rapidly transferred from one position to the other. These peculiar motions are effected by the combination of the eccentric with the link and slotted lever. The vessel H is filled with some fluid that vaporizes at a high temperature—as mercury, which will commence evaporating at 650°. When this temperature is attained, a portion of the fluid will be forced through the tube *h*, raising the diaphragm L and lever *l*, by which the damper *n* is closed, the combustion in the furnace is checked, and the temperature of the heating-surface reduced. As the temperature falls a portion of the vapor is condensed and the diaphragm L sinks until the damper *n* is again opened and the fire quickened. Thus the temperature of the heating-surfaces is uniformly maintained at about the point the metal can safely bear.

Having explained the several parts, I will proceed to describe the machine in operation.

Figure 13:
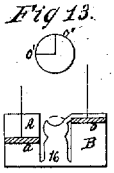
Figure 6:
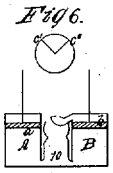
Figure 10:
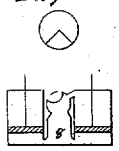
Figure 11:
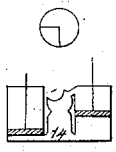
Figure 12:
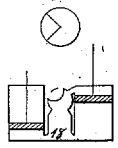

By referring to Figs. 6, 7, 8, 9, 10, 11, 12, and 13, the position of the pistons and valve at each eighth of a revolution can be seen. The circle above each diagram shows the position of the cranks, crank C′ carrying the working-piston *a*, and crank C″ carrying the changing-piston *b*. The pressure of the air in the cylinders is denoted in each diagram by the small figures in red. These figures may not be strictly correct, but will suffice to illustrate the mode of operation. Suppose the parts, in commencing, to be in the position shown by Fig. 6. Piston *a* has nearly completed its upstroke, piston *b* has just commenced its downstroke, and the induction and eduction ports have commenced to open. If, now, the main shaft is turned to the right one-eighth of a revolution, the various parts will have assumed the position shown in Fig. 7. Piston *a* has completed its upstroke and piston *b* has moved down half its stroke, drawing in a supply of cold air to fill the space above it and forcing the hot air beneath it out through the regenerator, where it leaves a large portion of its heat, and then escapes through the exhaust-port. At the next eighth of a revolution (see Fig. 8) piston *a* has commenced its downstroke, and piston *b* has nearly completed its downstroke. At or near this point the valve M closes both the induction and eduction ports *d′* and *d*, and opens a communication through the cylinder-port *d″* between the upper side of *b* and the lower side of both *a* and *b*. At the next position (see Fig. 9) *a* has moved down a half stroke and piston *b* is at the bottom of its stroke. In Fig. 10, *a* has nearly completed its downstroke, having forced the hot air beneath it up through the regenerator and out through the port *d* during the early part of its downward motion, and compressed it with the air above *b* during the latter portion. This compression, of course, requires considerable power and necessitates a heavy or quick-running fly-wheel, but it greatly increases the pressure during the upstroke and serves to overcome the momentum of the parts, having in this respect the same effect as cushioning by the early closing of the exhaust in steam-engines. In this figure piston *b* has just commenced its upstroke. In Fig. 11, *a* has completed its downstroke, and *b* has moved up half stroke. In Fig. 12, *a* has commenced and *b* has nearly completed its upstroke, and the latter has driven the cold air which was above it down through the regenerator, absorbing the heat previously treasured in its metal. Thence it flows in contact with the hot surface below and fills the space beneath both *a* and *b* at a greatly-increased pressure and temperature, as indicated by the red figures. In Fig. 13, *a* has been forced by the pressure below it through half its upstroke, *b* being at the end of its upstroke. At the next eighth the revolution is completed, and the parts have again assumed the position shown in Fig. 6, *a* having nearly completed its upstroke, and *b* just commencing its downstroke, and the exhaust and induction ports being just opening.

Fig. 14 is a diagram intended to show approximately the pressure on the under side of the working-piston, and consequently on both sides of the changing-piston at all points in the stroke. The elevation of the black figures 6, 7, 8, 9, 10, 11, 12, and the accompanying figures in red, show the pressure under the piston in the several positions shown by the corresponding figures—*i. e.*, Figs. 6, 7, &c. The lines extending from 11, 12, 13, 6, 7 to the base of the diagram show the pressure under the piston *a* during the upstroke; the shorter lines extending from 7, 8, 9, 10, 11 to the base show the pressure (adverse) during the downstroke. The line joining 11, 12, 13, 6, 7 is higher than the corresponding one joining 7, 8, 9, 10, 11, and the area between these lines indicate in a manner familiar to steam-engineers how much more power is derived from the upstroke of piston *a* than is lost in the return-stroke of the same.

In this engine it is seen that the pressure acts only in one direction to force the piston up. The momentum of the fly-wheel must, therefore, be depended on to complete the downward stroke against a pressure which rapidly increases toward the termination of the motion, but by obvious means two changing pistons and cylinders might be combined with two corresponding working pistons and cylinders in the same manner as here represented, so as to form a double acting engine.

The advantages due to my invention are as follows: First, I am enabled to use the full effect of the heated air expanding directly to the working-piston; second, I dispense with pumps and coolers and at the same time run at high speeds without noise; third, the heat regulator or limiter protects the heating-surfaces from the destructive effects of an extreme high temperature, and regulates the fire so as to keep the interior of the heating-surfaces at a nearly uniform degree of heat under all conditions; fourth, the area of passage-way through the regenerator is proportioned to the bulk of the air at all points, and the resistance to the passage of the air is thereby much reduced; fifth, the valve, moved as described, performs the three-fold office of induction, eduction, and equilibrium valve with less friction and less liability to derangement than any means previously known, and (what is very important) without involving the necessity for as much air-space within the passages.

Having thus fully described my invention and the advantages thereof, what I claim as new, and desire to secure by Letters Patent, is—

1. The arrangement of the passage *e c*, relatively to the working-cylinder A, regenerator-chamber E, and changing-cylinder B, so as to connect them at their hot ends, substantially as and for the purpose herein specified.

2. The within-described arrangement of the working-cylinder A, changing-cylinder B, regenerator F, and the valve or valves by which the piston *b* is made both to change the air from the cold to the hot end of the cylinder and to receive a fresh volume of air for the next stroke, with the advantages within set forth.

3. Automatically regulating the temperature of the interior of the heating-surfaces by the employment of the parts H and L, arranged relatively to the heating-surfaces of the cylinders A and B and to the damper *n*, or its equivalent, substantially as within described.

4. Giving the regenerator an increasing area from the cold to the hot side, substantially as and for the purpose herein set forth.

5. Working the single valve M, in combination with the two pistons *a* and *b*, as described, so as to thereby accomplish the threefold purpose of induction, eduction, and equilibrium valve, substantially in the manner and with the advantages herein set forth.

In testimony whereof I have hereunto set my name in the presence of two subscribing witnesses.

STEPHEN WILCOX, JR.

Witnesses:

G. H. BABCOCK,

CHAS. W. SMITH.